United States Patent [19]
Takagi et al.

[11] Patent Number: 5,754,335
[45] Date of Patent: May 19, 1998

[54] INFRARED MICROSCOPE FOR ANALYSIS OF A SELECTED SAMPLE AREA

[75] Inventors: Nobuo Takagi, Nagaokakyo; Hiroshi Ohta, Kadoma; Tadashi Wachi, Nakagyo-ku, all of Japan

[73] Assignee: Shimadzu Corporation, Kyoto, Japan

[21] Appl. No.: 848,499

[22] Filed: May 8, 1997

[30] Foreign Application Priority Data

May 10, 1996 [JP] Japan ................ 8-140952

[51] Int. Cl.$^6$ .............. G02B 21/00; H04N 7/18
[52] U.S. Cl. .............. 359/368; 348/79; 359/369; 359/738
[58] Field of Search ............ 359/368, 369, 359/381, 355, 356, 738, 739, 740, 618, 630; 348/578, 584, 79

[56] References Cited

U.S. PATENT DOCUMENTS 4,877,960 10/1989 Messerschmidt et al. ............ 250/341

FOREIGN PATENT DOCUMENTS 405100170 4/1993 Japan ................ 359/368
5-181066 7/1993 Japan.
1 564 628 4/1980 United Kingdom.

*Primary Examiner*—Thong Nguyen
*Assistant Examiner*—Mark A. Robinson
*Attorney, Agent, or Firm*—Armstrong, Westerman, Hattori, McLeland & Naughton

[57] ABSTRACT

Before a measurement for an infrared analysis of a sample is performed, a measurement area of the sample is set. In the measurement area setting mode, a camera takes the image of the whole sample, and the image is shown on a display. An image of an aperture is superimposed on the image of the sample in the display. When an operator uses a mouse connected to a controller of the infrared microscope to change the width of the image of the aperture on the display, an aperture signal generator generates an aperture signal corresponding to the width of the aperture image. An aperture image signal generator receives the aperture signal and generates an aperture image signal having the width. Thus the image of the sample superimposed on the image of the aperture in the display changes accordingly, by which the operator confirms the measurement area, i.e., the position and width of the aperture, in the sample. Since the image of the aperture is generated electronically in the present invention, no hardware such as expensive lenses or a precise mirror-moving mechanism is necessary.

6 Claims, 4 Drawing Sheets

INFRARED MICROSCOPE FOR ANALYSIS OF A SELECTED SAMPLE AREA

The present invention relates to an infrared microscope which performs a spectral analysis of a limited area of a sample surface using infrared light.

BACKGROUND OF THE INVENTION

In an infrared microscope, infrared light is cast on a sample, and the infrared light that has passed through the sample (or is reflected by the sample surface) is spectrally measured, whereby the sample is analyzed. It is usually the case that a limited area of the sample is required to be analyzed. In such a case, the scope of the infrared light that has passed through the sample (or is reflected by the sample surface) is limited by means of an aperture. It is necessary in this case to set the aperture appropriately in relation to the sample beforehand in order to measure a desired area of the sample correctly.

FIG. 8 illustrates the optical system of a conventional infrared microscope (Publication No. H05-181066 of the Japanese Unexamined Patent Application). When setting a measurement area of a sample 16 in the infrared microscope, a first movable mirror 50 and a second movable mirror 52 are brought into the optical path as shown by the solid line, and a visible light is cast onto the sample 16 from a transmission light source 12 and another visible light is cast onto an aperture plate 56 from an aperture lamp 54. The light from the transmission light source 12 is converged by a condenser lens unit 14 onto the sample 16. After passing through the sample 16, the light travels via an objective lens unit 18, the first movable mirror 50, a fixed mirror 58 and a fixed half mirror 60 to a viewer (not shown). The light from the aperture lamp 54, on the other hand, passing through the aperture 56a of the aperture plate 56 is reflected by the second movable mirror 52, passes through the half mirror 60 and also enters the viewer. Thus the whole image of the sample 16 and the image of the aperture 56a are superimposed in the viewer, whereby the position of the aperture 56a in relation to the sample 16 is made visible. Looking at the superimposed image in the viewer, the operator sets the location and width of the aperture 56a.

A measurement for an infrared analysis of the sample 16 is performed as follows. The first movable mirror 50 and the second movable mirror 52 are withdrawn from the optical path as shown by the broken line. Then infrared light is cast from the transmission light source 12 to the sample 16 via the condenser lens unit 14. After passing through the sample 16, the infrared light is converged by the objective lens unit 18 to form an enlarged infrared image of the sample 16 on the plane of the aperture 56a. Infrared light of a portion of the infrared image passes through the aperture 56a and goes upward into an infrared measurement section (not shown). The operations are quite similar when a reflective observation is conducted where an infrared light reflected from the sample surface is analyzed.

The optical system of the conventional infrared microscope includes the half mirror 60 for superimposing the image of the sample 16 and the image of the aperture 56a and some lens units used in the viewer to form a visible image, which are rather expensive. The movable mirrors 50 and 52 require precise locating mechanisms in order to correctly superimpose the image of the sample and that of the aperture at right positions. These expensive components and precise mechanisms boosted the cost of the conventional infrared microscope.

SUMMARY OF THE INVENTION

An object of the present invention is therefore to provide an improved infrared microscope equipped with a new mechanism of setting the measurement area on the sample by less expensive means.

According to the present invention, an infrared microscope includes:

a) an optical system for forming an image of a sample on a focal plane;

b) an aperture placed on the focal plane, where the area of the aperture is variable;

c) a camera for taking the image of the sample and for generating a sample image signal representing the image of the sample;

d) a display responsive to the sample image signal for showing the image of the sample;

e) operating means for allowing an operator to set the area of the aperture;

f) an aperture signal generator for generating an aperture signal corresponding to the area of the apertur set by the operating means; and g) an aperture image signal generator responsive to the aperture signal for generating an aperture image signal representing the image of the aperture having the area set by the operating means and for superimposing the aperture image signal to the sample image signal.

Before a measurement for an infrared analysis of a sample is performed, a measurement area of the sample is set. In the measurement area setting mode, the camera takes the image of the whole sample, and the image is shown on the display. An image of the aperture is also shown on the display superimposed on the image of the sample by means of the aperture image signal generator. When the operator uses the operating means such as a mouse connected to a computer controlling the aperture of the infrared microscope or a knob for rotating a cam between a pair of aperture plates, the detail of which will be described later, to change the area or width of the image of the aperture on the display, the aperture signal generator generates an aperture signal corresponding to the width. The aperture image signal generator receives the aperture signal and generates an aperture image signal for showing an image of the aperture having the width on the display. Thus the image of the sample superimposed on the image of the aperture in the display changes accordingly, by which the operator confirms the measurement area, i.e., the position and width of the aperture, in the sample.

Since the image of the aperture is generated electronically in the present invention, no hardware such as expensive lenses or a precise mirror-moving mechanism is necessary. Another advantage is that the measurement area setting can be facilitated because the area of the aperture on the display can be changed in various ways, i.e., using a mouse or a keyboard, irrespective of the actual aperture adjusting mechanism.

The infrared microscope may further include a controller for controlling the aperture and the aperture image signal generator as follows. In the measurement area setting mode, the controller allows the aperture image signal generator to superimpose the aperture image signal to the sample image signal but does not allow the aperture to actually change the area of the aperture. In the measurement mode, the controller allows the aperture to actually change the area of the aperture. When the aperture is placed in the optical path between the sample and the camera, this facilitates the measurement area setting because the image of the sample is not hidden by the aperture in the measurement area setting mode.

DETAILED DESCRIPTION OF A PREFERRED EMBODIMENT

Figure 1:
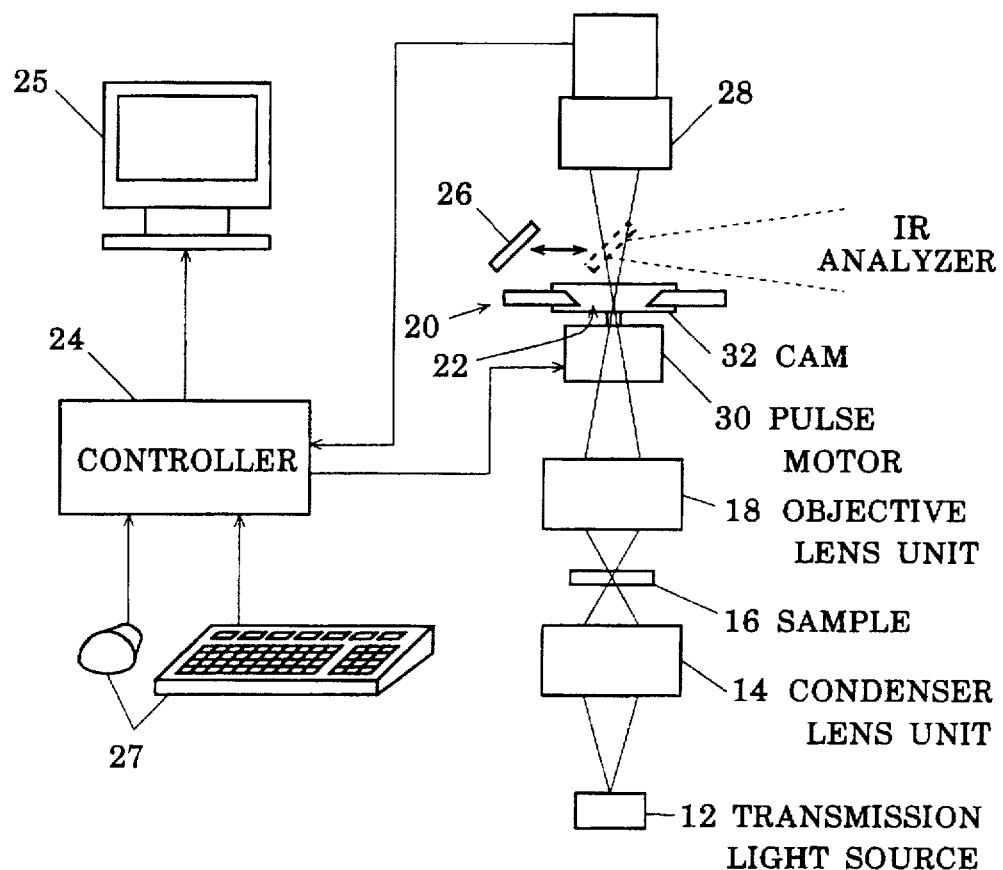
FIG. 1 is a structural diagram of the first embodiment of the present invention.
Figure 8:
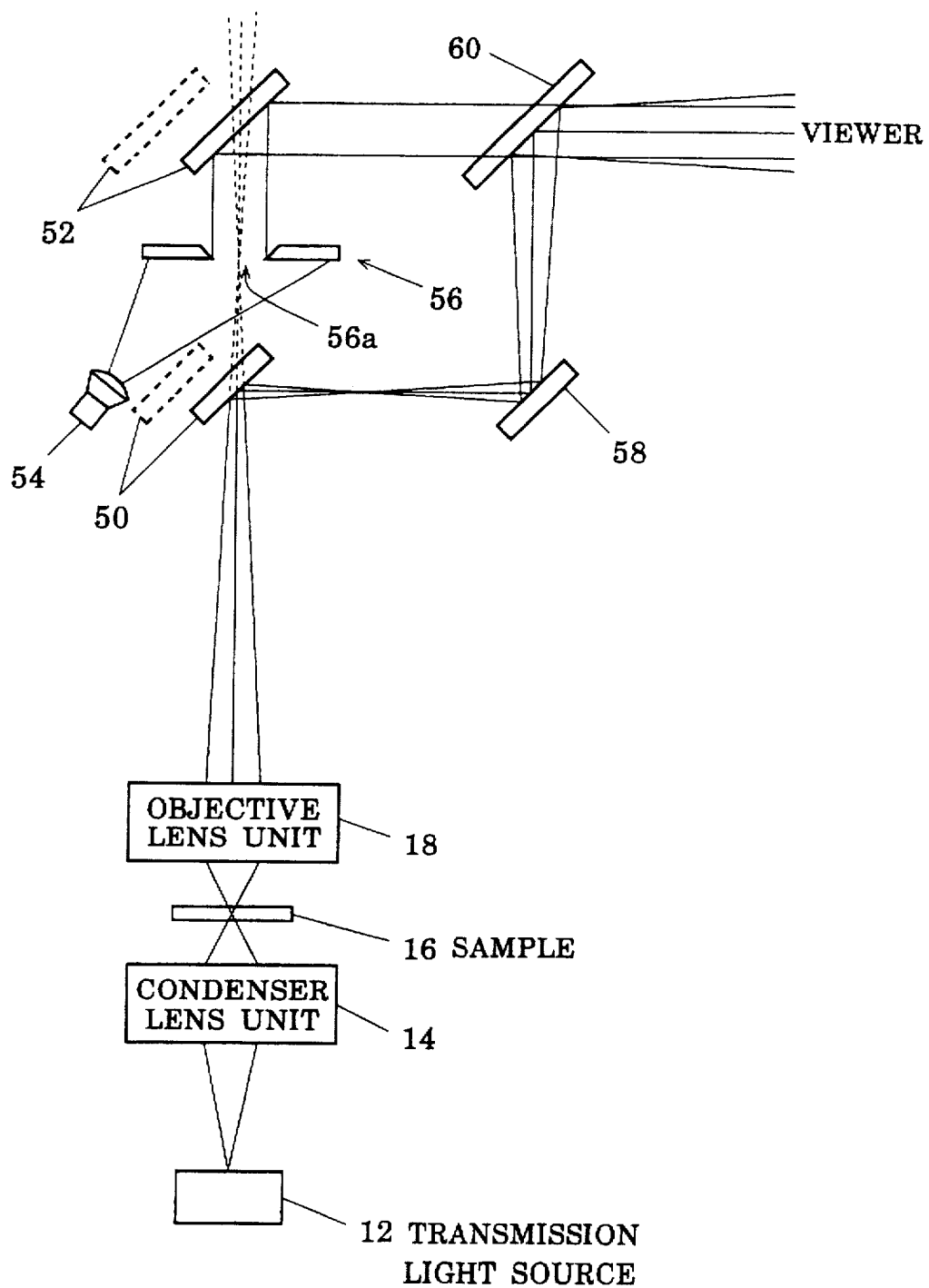
FIG. 8 is a diagram of the optical system of a conventional infrared microscope.

The first embodiment of the present invention is described referring to FIG. 1, in which the transmission light source 12, condenser lens unit 14, sample 16 and the objective lens unit 18 may be the same as those shown in FIG. 8. An aperture unit 20 is placed at the position where the light is focused by the objective lens unit 18. The path of the light after the aperture unit 20 can be changed by a movable mirror 26 which is driven by a controller 24. A CCD (Charge Coupled Device) camera 28 is provided on the path of light and is operative when the movable mirror 26 is withdrawn from the optical path, as shown by the solid line. The image signal (sample image signal) from the CCD camera 28 is sent to the controller 24 which is composed of a microcomputer, memory and other peripheral devices. The controller 24 converts the sample image signal from the CCD camera 28 to another format adapted to be shown on a display 25.

Figure 2A:
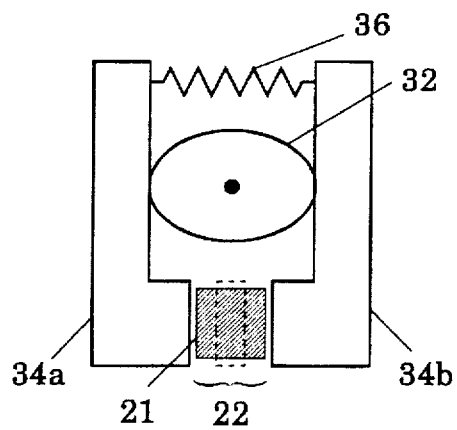
FIGS. 2A and 2B are plan views of the aperture adjusting mechanism of the first embodiment.
Figure 2B:
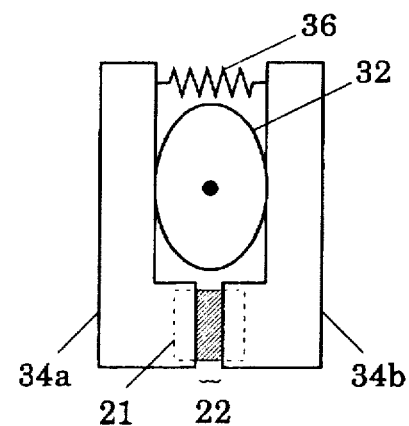

The aperture unit 20 has a variable aperture 22, and the width of the aperture 22 is changed by an aperture adjusting mechanism including a pulse motor 30 controlled by the controller 24 and a cam 32. The aperture adjusting mechanism details can be seen by referring to FIGS. 2A and 2B. The aperture unit 20 consists of two laterally movable aperture plates 34a and 34b which define the periphery of the aperture 22. An oval cam 32 is provided between the two aperture plates 34a and 34b, and the aperture plates 34a and 34b are captured in tension by a spring 36 toward the cam 32. When the oval cam 32 is rotated by the pulse motor 30, the distance between the aperture plates 34a and 34b, i.e., the width of the aperture 22, is changed. FIG. 2A shows the aperture unit 20 when the width of the aperture 22 is at a maximum, and FIG. 2B shows when the width is at a minimum. By controlling the rotation of the pulse motor 30 and thus the angular position of the cam 32, the width of the aperture 22 is adjusted arbitrarily. The profile of the cam 32 need not be exactly oval but it can be otherwise if the distance between the aperture plates 34a and 34b can be changed. The aperture unit 20 is constructed so that the whole image 21 of the sample 16 formed on the plane of the aperture 22 lies within the aperture 22 when the width of the aperture 22 is maximum as shown in FIG. 2A. When, for example, the magnification of the objective lens unit 18 is set at 15, the maximum width of the aperture 22 is set at more than 15 times the full width of the sample 16.

In presetting the infrared microscope constructed as above, the relationship between the width of the image 29 of the aperture 22 on the display 25 (FIG. 3) and the rotational position (i.e., the number of pulses) of the pulse motor 30 is obtained, and the relationship is stored in the memory of the controller 24. The relationship may actually be obtained as follows. With the movable mirror 26 withdrawn from the optical path, visible light is put into the optical path from the transmission light source 12. Starting from the minimum width of the aperture 22, one or a preset number of pulses are given to the pulse motor 30 at a time to rotate the cam 32 by a preset small angle. Through a progressive rotation of the cam 32 until the maximum width of the aperture 22 is attained, the relationship between every position of the cam 32 and the width of the aperture 22 on the display 25 is observed.

Figure 3:
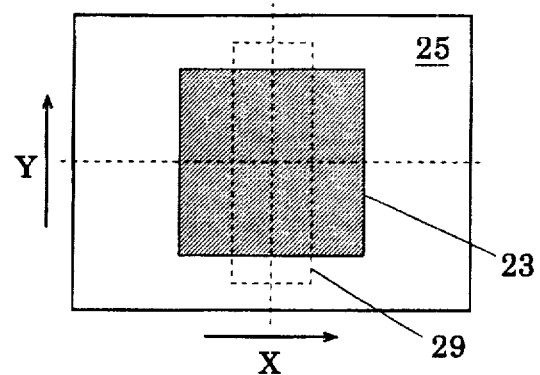
FIG. 3 is an explanatory view of a display in which the images of the sample and the aperture are superimposed.

Based on the relationship thus obtained, the measurement area of the sample 16 is set as follows. First the movable mirror 26 is withdrawn from the optical path, as shown by the solid line in FIG. 1, and the width of the aperture 22 is set at the maximum. When visible light is provided to the sample 16 from the transmission light source 12, the whole image 23 of the sample 16 is shown on the display 25 as in FIG. 3. Looking at the image 23 of the sample 16 on the display 25 and using an input device 27 (a mouse or keyboard in FIG. 1) connected to the controller 24, the operator determines the measurement area of the sample 16 by designating the coordinate. Provided that the movement of the aperture plates 34a and 34b as shown in FIGS. 2A and 2B corresponds to the horizontal direction (X-axis) on the display 25 (FIG. 3), the measurement area can be determined by designating an X-coordinate because the two aperture plates 34a and 34b move symmetrically with respect to the center. When the measurement area is thus determined by the operator, the controller 24 generates a signal (an aperture image signal) representing an image 29 of the aperture 22 using the data of the X-coordinate designated by the operator. The image 29 of the aperture 22 is superimposed on the image 23 of the sample 16 on the display 25 as shown in FIG. 3. Looking at the superimposed images 23 and 29 on the display 25, the operator can easily confirm the determined measurement area on the sample 16 or renew the measurement area by designating a new X-coordinate.

When the measurement area is finally set, the operator uses the input device 27 to give a command to the controller 24 to start a measurement for an infrared analysis of the sample 16. When the command is received, the controller 24 brings the movable mirror 26 into the optical path as shown by the broken line in FIG. 1. Then the controller 24 gives a number of pulses to the pulse motor 30 corresponding to the final set of measurements for the area, based on the above-described relationship stored in the memory. As the pulse motor 30 rotates, the aperture plates 34a and 34b move to the position corresponding to the image 29 of the aperture 22 on the final display 25. After the width of the actual aperture 22 is fixed, the transmission light source 12 is energized to provide infrared light to the sample 16. The infrared light transmitting through the sample 16 is focused on the plane of the aperture 22 forming an infrared image of the sample 16. A portion of the infrared image passing through the aperture 22 enters the infrared analyzing section (IR ANALYZER, not shown) via the movable mirror 26.

Figure 4A:
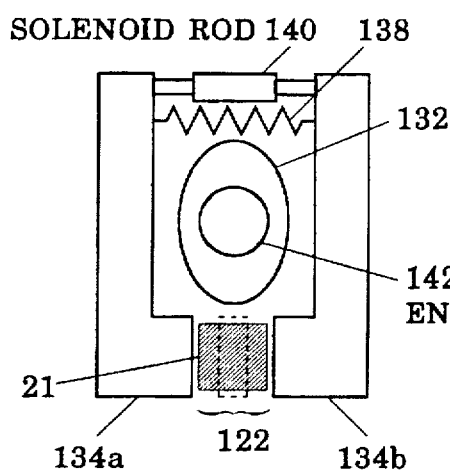
FIGS. 4A and 4B are plan views of the aperture adjusting mechanism of the second embodiment.
Figure 4B:
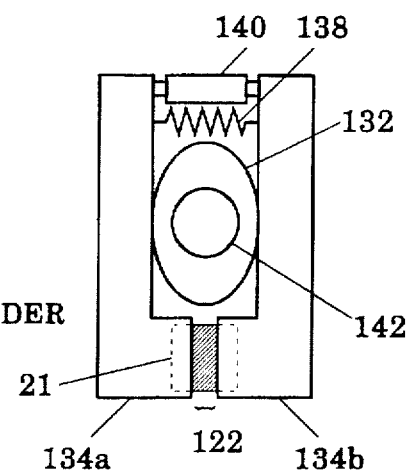
Figure 5:
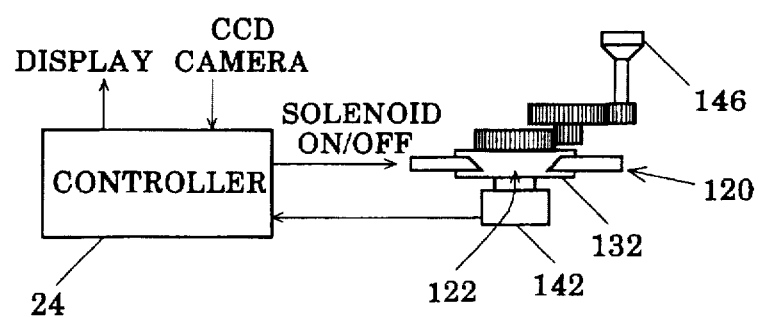
FIG. 5 is a side view of the aperture adjusting mechanism of the second embodiment.

Another infrared microscope as the second embodiment of the present invention is described referring to FIGS. 4A, 4B and 5. The aperture unit 120 of the present embodiment is shown in FIGS. 4A and 4B. The two aperture plates 134a and 134b are connected by a compression spring 138 and a solenoid plunger 140. On the axis of the cam 132 placed between the aperture plates 134a and 134b, an encoder 142 is installed for sending out a signal representative of the rotational position of the cam 132. When an electric current is supplied to the solenoid plunger 140 responsive to a command from the controller 24 (FIG. 1), the solenoid plunger 140 contracts and the two aperture plates 134a and 134b are drawn inward until they abut up to the cam 132 as shown in FIG. 4B. When the current to the solenoid plunger 140 is stopped, the aperture plates 134a and 134b return to their original position as shown in FIG. 4A by means of the compression spring 138.

The aperture adjusting mechanism of the present embodiment is illustrated in FIG. 5. The signal from the encoder 142 representing the rotational position of the cam 132 is sent to the controller 24. Instead of the control using the pulse motor 30 as in the previous embodiment, the width of the aperture 122 is determined by the rotational position of the cam 132 which is adjusted manually by a knob 146. Of course any other mechanism can be used to determine the rotational position of the cam 132.

In presetting the infrared microscope of the present embodiment, the relationship between the width of the image 29 of the aperture 122 on the display 25 and an output signal (cam position signal) of the encoder 142 is obtained, and the relationship is stored in the memory of the controller 24. The relationship may actually be obtained as follows. With the movable mirror 26 withdrawn from the optical path, visible light is put into the optical path from the transmission light source 12. The cam 132 is set at the position where the width is at its minimum in the moving direction of the aperture plates 134a and 134b as in FIG. 4A, and the solenoid plunger 140 is energized. Starting from the minimum width of the aperture 122, the knob 146 is operated so as to rotate the cam 132 and increase the width of the aperture 122 a little at a time. The relationship between the output signals (cam position signal) from the encoder 142 and the widths of the image 29 of the aperture 122 on the display 25 is stored in the memory of the controller 24.

The process of setting a measurement area is described next. In this process, the solenoid plunger 140 is not energized so that the aperture plates 134a and 134b are pushed apart by the compression spring 138 to the maximum width of the aperture 22 as in FIG. 4A. Then the whole image 23 of the sample 16 is shown on the display 25 as described in the first embodiment. When the cam 132 is manually rotated, the encoder 142 sends out a signal corresponding to the rotational position of the cam 132. Based on the cam position signal and referring to the relationship between the cam position signal and the width of the image 29 of the aperture 122 on the display 25 previously stored in the memory, the controller 24 generates signals to the display 25 for showing the image 29 of the aperture 122 whose width corresponds to the cam position signal. The image 29 of the aperture 122 is superimposed onto the image 23 of the sample 16 in the display 25. When the operator turns the knob 146 to rotate the cam 132 looking at the superimposed images 23 and 29 on the display 25, the width of the image 29 of the aperture 22 changes accordingly on the image 23 of the sample 16 on the display 25. When the width of the image 29 of the aperture 122 is finally determined by the operator, the cam 132 is at the rotational position corresponding to the width of the actual aperture 122 thus determined, whereby the measurement area of the sample 16 is set.

When the operator uses the input device 27 to send a command to start a measurement for an infrared analysis of the sample 16, the controller 24 brings the movable mirror 26 into the optical path and energizes the solenoid plunger 140. The aperture plates 134a and 134b are drawn closer until they abut up to the cam 132, where the aperture 122 is actually set at the preset width.

Figure 6:
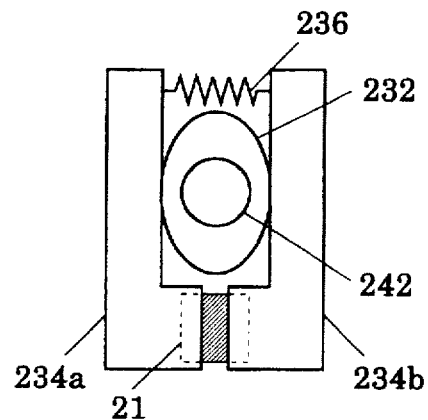
FIG. 6 is a plan view of the aperture adjusting mechanism of the third embodiment.
Figure 7:
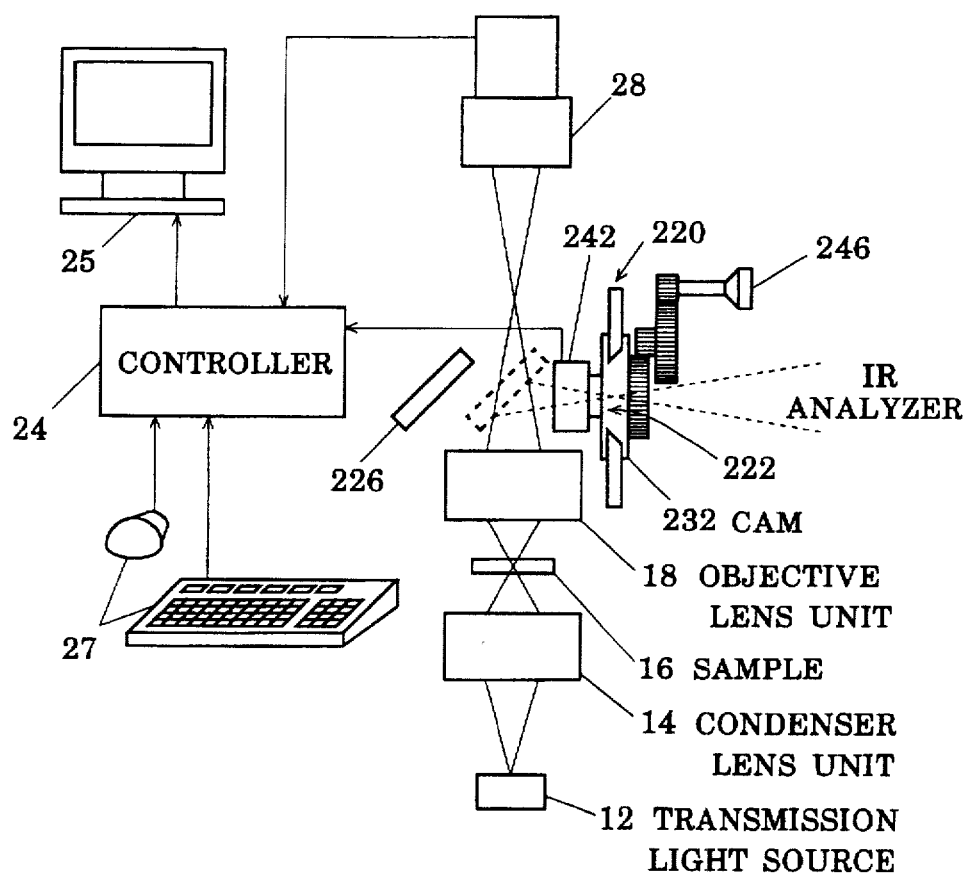
FIG. 7 is a structural diagram of the third embodiment.

The third embodiment of the present invention is described referring to FIGS. 6 and 7. As shown in FIG. 6, the aperture unit 220 of the present embodiment includes two aperture plates 234a and 234b connected by a tension spring 236, and a cam 232 between the two aperture plates 234a and 234b. On the axis of the cam 232 is installed an encoder 242 as in the previous embodiment. As shown in FIG. 7, the aperture unit 220 is placed in such a position that the image of the sample 16 is formed by the objective lens unit 18 on the plane of the aperture 222 when the movable mirror 226 is put into the optical path (as shown by the broken line).

As in the previous embodiment, the relationship between the width of the image 29 of the aperture 222 on the display 25 and the cam position signal of the encoder 242 is obtained, and the relationship is stored in the memory of the controller 24 beforehand. Since, however, the image 29 of the aperture 222 cannot be taken by the CCD camera 28 in the present embodiment, the setting process as described above is not obtainable. Instead, the moving characteristic of the encoder 242 is observed beforehand to obtain the relationship between the rotational position of the encoder 242 and the cam position signal given out from the encoder 242. The profile of the cam 232 is also measured to obtain the diameter of the cam 232 with respect to the rotational position of the cam 232. After taking this information from the encoder 242 and the cam 232, the aperture unit 220 is placed at the proper position in the infrared microscope as shown in FIG. 7. Then the width of the aperture 222 is set to its minimum value, and the rotational position of the cam 232 at this time is defined as zero. Correlating the cam position signal from the encoder 242 at this position of the cam 232, the relationship between the cam position signals and the rotational positions of the cam 232, or the width of the aperture 222, can be obtained.

When setting a measurement area, the whole image 23 of the sample 16 is shown on the display 25 and the cam 232 is rotated manually as in the preceding embodiments. As the cam 232 rotates, the width of the aperture 222 actually changes in the present embodiment, but the whole image 23 of the sample 16 remains shown on the display 25 because the aperture unit 220 is not on the path of the light from the objective lens unit 18 to the CCD camera 28. Receiving the cam position signal from the encoder 242, the controller 24 generates signals to the display 25 for showing the image 29 of the aperture 222 whose width corresponds to the cam position signal. The image 29 of the aperture 222 is superimposed to the image 23 of the sample 16 in the display 25. When the operator turns the knob 246 looking at the superimposed images on the display 25, the width of the actual aperture 222 as well as the image 29 of the aperture 222 on the display 25 changes accordingly. After finally determining the position of the aperture 222 with respect to the sample 16, the operator uses the input device 27 to command the start of a measurement for an infrared analysis of the sample 16. Responsive to the start command, the controller 24 brings the movable mirror 226 into the optical path and energizes the transmission light source 12 to provide infrared light to the sample 16. The infrared light transmitting through the sample 16 is focused on the plane of the aperture 222 after being reflected by the movable mirror 226, and the part of the infrared light corresponding to the aperture 222 is sent to the infrared analyzing section (IR ANALYZER).

In the above described three embodiments, the apertures are such that only width changes. It is also possible to use such an aperture that changes two-dimensionally by providing another pair of aperture plates in the right angle position to those described above. Further, by providing the aperture adjusting mechanism on a rotatable disk, the measurement area can be selected at any place on a circular area of the sample. Similarly, by using a two-dimensionally movable sample stage driven by motors and the aperture adjusting mechanism of the first embodiment, any place on the sample 16 can be automatically analyzed.

Though, in the foregoing description of the embodiments, transmitting infrared microscopes are solely described, it is a matter of course that the present invention is also applicable to reflection type infrared microscopes.

What is claim is:

1. An infrared microscope comprising:
   a) an optical system for forming an image of a sample on a focal plane;
   b) an aperture placed on the focal plane, an area of the aperture being variable;
   c) a camera for taking the image of the sample and for generating a sample image signal representing the image of the sample;
   d) a display responsive to the sample image signal for showing the image of the sample;
   e) operating means for allowing an operator to set the area of the aperture;
   f) aperture signal generating means for generating an aperture signal corresponding to the area of the aperture set by the operating means; and
   g) aperture image signal generating means responsive to the aperture signal for generating an aperture image signal representing the image of the aperture having the area set by the operating means and for superimposing the aperture image signal onto the sample image signal.

2. The infrared microscope according to claim 1 further comprising a controller for allowing the aperture image signal generating means to superimpose the aperture image signal onto the sample image signal but not allowing the aperture to actually change the area of the aperture in a measurement area setting mode, and for allowing the aperture to actually change the area of the aperture in a measurement mode.

3. The infrared microscope according to claim 1, wherein the infrared microscope further comprises:
   a motor for changing the area of the aperture; and
   a motor controller for controlling the motor to set the area of the aperture according to the signal from the operating means, wherein the motor controller comprises the aperture signal generating means.

4. The infrared microscope according to claim 3 further comprising a controller for allowing the aperture signal generating means to send the aperture signal to the aperture image signal generating means but halting the motor controller to send a motor control signal to the motor in a measurement area setting mode, and for allowing the motor controller to send the motor control signal to the motor in a measurement mode.

5. The infrared microscope according to claim 2, wherein:
   the aperture comprises a pair of aperture plates, a cam placed between the pair of aperture plates and a solenoid plunger connecting the pair of aperture plates to each other; and
   the controller rotates the cam to a position corresponding to the area of aperture shown on the display while maintaining the solenoid plunger in an extended position to keep the pair of aperture plates apart in the measurement area setting mode, and contracts the solenoid plunger until the pair of aperture plates abut up to the cam in the measurement mode.

6. The infrared microscope according to claim 2, wherein the infrared microscope further comprises a movable mirror movable between a first position where a light from the sample is sent to the camera and a second position where the light from the sample is sent to an analyzer, and the controller brings the movable mirror to the first position in the measurement area setting mode and to the second position in the measurement mode.

* * * * *